March 22, 1960 — H. H. DEIST ET AL — 2,929,103
APPARATUS FOR MANUFACTURING RUBBER ARTICLE
Filed Dec. 5, 1956 — 2 Sheets-Sheet 1
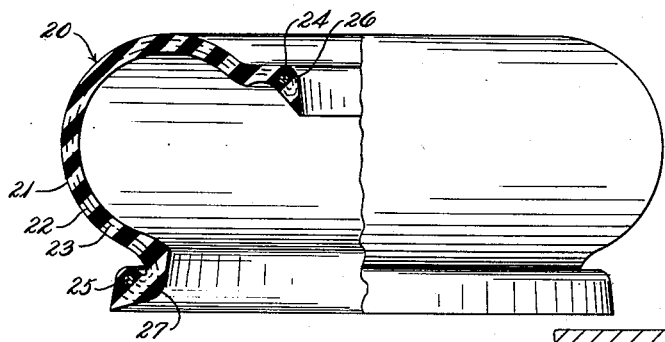
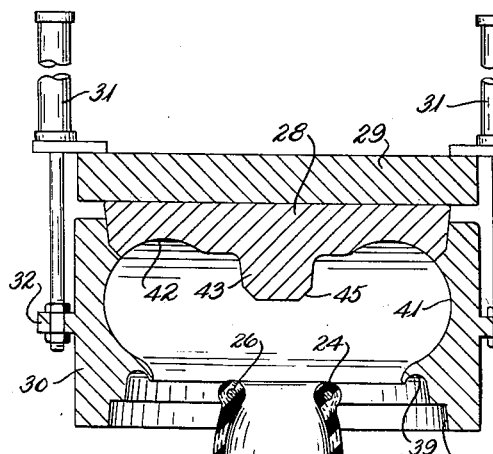
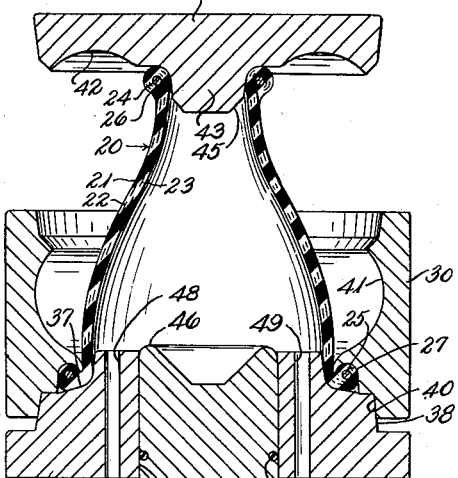
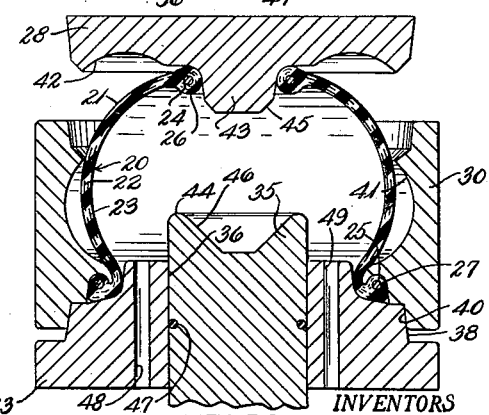
INVENTORS
HERBERT H. DEIST
JACK L. HOLLIS
BY W. A. Fraser
ATTY.

March 22, 1960 H. H. DEIST ET AL 2,929,103
APPARATUS FOR MANUFACTURING RUBBER ARTICLE
Filed Dec. 5, 1956 2 Sheets-Sheet 2
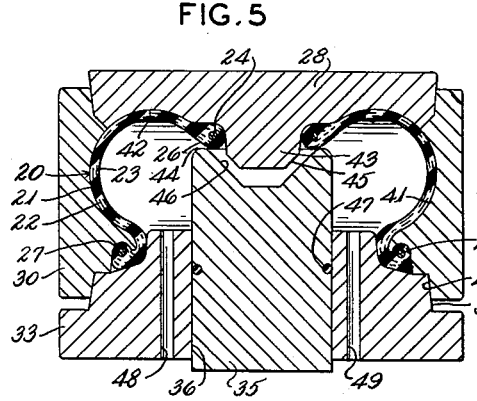
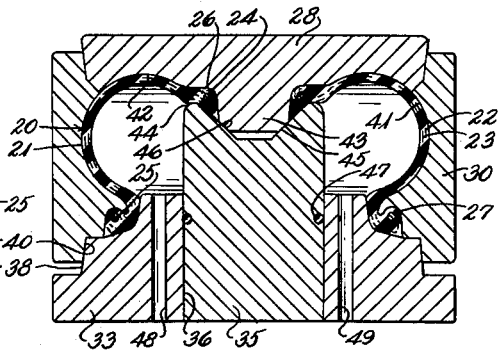
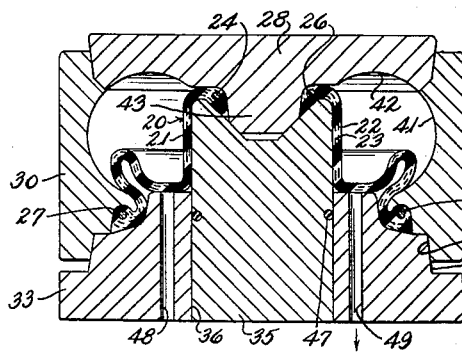
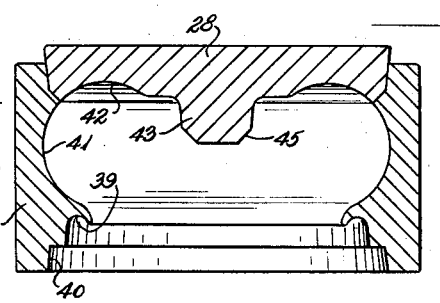
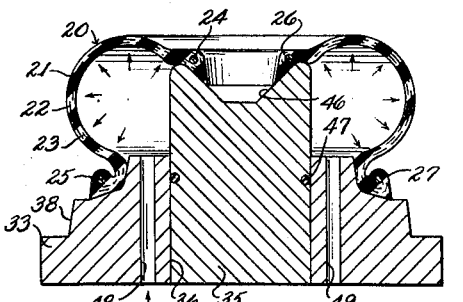
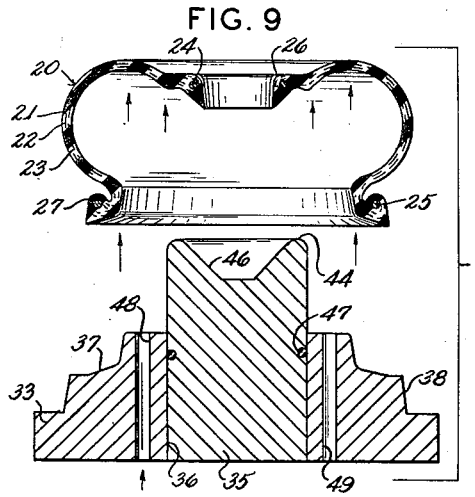
INVENTORS
HERBERT H. DEIST
BY JACK L. HOLLIS
ATTY.

United States Patent Office 2,929,103
Patented Mar. 22, 1960

2,929,103

APPARATUS FOR MANUFACTURING RUBBER ARTICLE

Herbert H. Deist and Jack L. Hollis, Akron, Ohio, assignors to The Firestone Tire & Rubber Company, Akron, Ohio, a corporation of Ohio Application December 5, 1956, Serial No. 626,528

4 Claims. (Cl. 18—34)

This invention relates to resilient bellows known as air springs and more particularly to an apparatus and method for molding such air springs.

The invention is primarily useful in molding an air spring having a single convolution body which terminates in beads of unequal diameters so that it compresses in a telescoping fashion when it is used in an automobile or other vehicle suspension. Such air springs are usually made of rubberized fabric plies which are wrapped about and anchored to inextensible rings which form the beads of the air springs and they are most conveniently built in frusto-conical form. According to the present invention, the vulcanizing mold embodying the invention is used, not only to vulcanize the air spring but also to shape the initial frusto-conically shaped air spring into the shape the air spring assumes in its neutral position in an automobile suspension.

The mold of the present invention has the advantages of simplicity of design and operation. It has a minimum of movable parts and it is effective in shaping the unvulcanized air spring into the required final form. It lends itself to automatic loading and unloading and hence it requires a minimum of labor and provides rapid production at low cost.

Further advantages and objects will be more fully apparent from the following description of a preferred form of the invention, reference being had to the accompanying drawings in which:

Figure 1 is a front elevation, partly in section, of an air spring, molded according to the invention and ready for installation in a vehicle wheel suspension;

Figure 2 is a diagrammatic view in longitudinal section showing a mold for molding the air spring of Figure 1, the mold being shown in open position and with an unvulcanized air spring in position ready to be molded;

Figure 3 is a view corresponding generally to Figure 2 showing the mold in partly closed position with the large bead partially clamped between the base of the mold and an intermediate mold section;

Figure 4 shows a further step in the closing of the mold with the air spring expanded outwardly to take the form of a convolution just before the mold closes;

Figure 5 shows the mold in fully closed position with the air spring expanded out into contact with the mold surfaces;

Figure 6 shows the mold in fully closed position and with an inner mandrel lifted upwardly out of the base of the mold in position to form the small bead of the air spring;

Figure 7 shows the mold at the end of the vulcanizing operation with a vacuum applied to the inside of the air spring to collapse the air spring to facilitate the opening of the mold;

Figure 8 shows the mold again fully opened just as air pressure is applied to the interior of the bellows;

Figure 9 indicates the manner in which internal air pressure is used to blow the air spring free of the mold.

The invention will be described with reference to a single convolution, telescoping air spring, an air spring which is most useful in modern automobile wheel suspensions. Such an air spring which is indicated generally at 20 in Figure 1, preferably comprises a body 21 of two plies, 22 and 23, of rubberized fabric, the fabric being essentially weftless and having cords which extend at an angle of about 15° to the axis of the air spring with the cords of one ply crossing the cords of the other. The interior of the bellows has an air-retaining lining of rubber which is preferably neoprene because of its oil resistant properties. The ends of the plies 22 and 23 are wrapped about and anchored to a pair of circular steel wire rings 24 and 25 to form the beads 26 and 27 of the air spring. Preferably, the beads 26 and 27 have shapes such as those shown in cross section in Figure 2, which are similar to the beads of a pneumatic tire, and which are used to hold the air spring within the automobile suspension in a manner which in large measure is analogous to the manner in which the beads of a tire are mounted on a conventional drop center automobile rim.

The air spring 20 is manufactured by assembling its components on a building drum by methods similar to those used in building conventional air springs, the only differences being those made necessary by the different diameters of beads 26 and 27. The air spring, as it is removed from the building drum, is somewhat conical in form, see Figure 2, although adjusts itself to bell-shaped form if it is stored for an appreciable time after it is built.

The mold for shaping and vulcanizing such a "green" or unvulcanized air spring comprises four separable parts which cooperate during their closing movement to bring the air spring into the required shape for vulcanization. As shown in Figure 2, these parts are a top end section 28 which is affixed to the ram 29 of a vulcanizing press, an intermediate section 30 which is supported by pneumatic cylinders 31 acting through lugs 32, a bottom end section or base 33 which is fixed to the platen 34 of the press and finally a bead forming mandrel 35 which is mounted to move axially through a central bore 36 in the base section and into cooperative engagement with the top section.

The base section 33 is stepped in the manner shown so as to provide a molding surface 37 to shape the large bead 27 of the air spring and to provide a slightly conical surface 38 which acts to center the intermediate section 30 upon the base as the mold closes.

The intermediate section at its lower end has a stepped construction adopted to cooperate with the base 33 which includes an annular molding surface 39 to shape the large bead of the air spring and a tapered surface 40 which engages the conical surface 38 of the base in the manner shown in Figure 3. The upper portion of the intermediate section has a concave molding surface 41 which helps to mold the single convolution of the air spring.

The top section 28 has a concave surface 42 which acts as an extension of the convolution molding surface 41, and which terminates at the base of an axially extending boss 43. The small bead 26 snugly fits over the boss 43 and is shaped between the annular edge 44 of mandrel 35 and the molding surfaces adjacent the boss, see Figure 5. In order to control the molding of bead 26 within accurate limits, the boss is convexly chamfered as indicated at 45 and the mandrel is concavely chamfered to fit, as indicated at 46, see Figure 6. When the mandrel 35 engages the boss, the mating of the chamfered surfaces ensures correct forming of the bead 26. The mandrel 35 is moved within the bore 36 by any suitable means such as by an air cylinder (not shown). The seal between the mandrel and the bore is provided by a conventional sealing gasket such as the O-ring indicated at 47.

At the beginning of the molding operation, the ram of the press is drawn upwardly to lift the top section and the air cylinders 31 are operated to lift the intermediate mold section clear of the base enabling the unvulcanized air spring 20 to be placed in position upon the base, see Figure 2. The air cylinders then lower the intermediate section downward into assembly with the base as shown in Figure 3 with the molding surfaces 37 and 39 of the two sections clamping the large bead 27 of the air spring between them in the manner shown in Figure 3. At this point the pressure on bead 27 is just enough to create a seal but not enough to finally shape the bead. The ram then descends until the boss 43 of the top section enters the small bead 26 and as soon as the bead is seated at the foot of the boss, the top section begins to exert a collapsing pressure upon the air spring. As the closing of the mold proceeds, the air spring is subjected to increasing axial collapse and a positive fluid pressure is introduced into the interior of the air spring, through a passage 48 in the base, expanding the air spring wall outwardly into contact with the convolution molding surfaces 41 and 42 of the intermediate and top sections, see Figure 4, until at the end of the downward stroke of the ram the mold sections are fully assembled with the air spring expanded fully out into contact with the mold surfaces, see Figure 5. At this time also the force of the ram is transmitted to the intermediate section to bring it into contact with the base to positively mold bead 27.

In the final step of the molding operation, the mandrel 35 is moved upwardly until it engages the central boss of the top section, in the manner shown in Figure 6, and positively molds the small bead 24 to the desired shape. Steam at a suitable temperature and pressure is then introduced into the air spring through a passage such as passage 49 to effect vulcanization of the air spring.

When the air spring is completely cured a vacuum is drawn in the air spring to collapse it in the manner shown in Figure 7 and the intermediate and top sections are withdrawn upwardly as shown in Figure 8. As soon as the mold is open the vacuum is relieved and the air under pressure is introduced into the air spring to blow it free of the mold as shown in Figure 9.

The details of construction of the mold and the operating parts may of course vary to a considerable extent but the construction shown generally in Figure 1 is preferred. It is to be understood of course that such details as the controls for the press and motivating air cylinders, the manner in which fluids are introduced within the air spring, the manner of heating the mold sections are all conventional and need not be described.

However, various modifications will no doubt occur to those skilled in the art without departing from the scope of the invention, the essential features of which are summarized in the appended claims.

What is claimed is:

1. Apparatus for shaping and vulcanizing an air spring having in its pre-vulcanized form a flaring body of flexible, vulcanizable material terminating at one end in a relatively large bead and at the other end in a bead having a diameter substantially smaller than said large bead, said apparatus comprising first and second mold end sections and an intermediate mold section between said end sections and adapted to contact the radially outer surface of said air spring, said mold end sections having relative axial movement and being adapted to contact said intermediate section, whereby they may be assembled in a closing movement to exert pressure on and to collapse said air spring axially, said first mold end section and said intermediate mold section having cooperating annular molding surfaces to mold said large bead, said second mold end section having an axial surface to shape and mold said small bead, means to bring said first and intermediate mold sections together to clamp and seal said large bead between said annular molding surfaces and to bring said second mold end section into forcible fluid-tight sealing engagement with said small bead to initiate the axial collapse of said air spring, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

2. Apparatus for shaping and vulcanizing an air spring having in its pre-vulcanized form a flaring body of flexible, vulcanizable material terminating at one end in a relatively large bead and at the other end in a bead having a diameter substantially smaller than said large bead, said apparatus comprising first and second mold end sections and an intermediate mold section between said end sections and adapted to contact the radially outer surface of said air spring, said mold end sections having relative axial movement and being adapted to contact said intermediate section, whereby they may be assembled in a closing movement to exert pressure on and to collapse said air spring axially, said first mold end section and said intermediate mold section having cooperating annular molding surfaces to mold said large bead, one of said mold end sections having an axial projection extending inwardly into the cavity of said mold when said mold is closed and having annular molding surfaces on said projection to shape and mold said small bead, means to bring said first and intermediate mold sections together to clamp and seal said large bead between said annular molding surfaces and to bring said second mold end section into forcible engagement with said small bead to initiate the axial collapse of said air spring, said axial projection engaging said small bead and making a substantial fluid-tight seal therewith, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

3. Apparatus for shaping and vulcanizing an air spring having in its pre-vulcanized form a flaring body of flexible, vulcanizable material terminating at one end in a relatively large bead and at the other end in a bead having a diameter substantially smaller than said large bead, said apparatus comprising first and second mold end sections and an intermediate mold section between said end sections and adapted to contact the radially outer surface of said air spring, said mold end sections having relative axial movement and being adapted to contact said intermediate section, whereby they may be assembled in a closing movement to exert pressure on and to collapse said air spring axially, said first mold end section and said intermediate mold section having cooperating annular molding surfaces to mold said large bead, said first mold end section having an axial projection extending inwardly into the cavity of said mold when said mold is closed and having annular molding surfaces on said projection to shape and mold said small bead, means to bring said first and intermediate mold sections together to clamp and seal said large bead between said molding surfaces and to bring said second mold end section into forcible engagement with said small bead to initiate the axial collapse of said air spring, said axial projection engaging said bead and making a substantially fluid-tight seal therewith, and means to apply fluid-pressure to the interior of said air spring as said axial collapse progresses whereby to expand the wall of said air spring outwardly during the closing movement of said mold sections and to force it against the surfaces of the molding cavity formed by the assembled mold sections.

4. Apparatus for shaping and vulcanizing an air spring having in its pre-vulcanized form a flaring body of flexible, vulcanizable material terminating at one end in a relatviely large bead and at the other end in a bead having a diameter substantially smaller than said large bead, said apparatus comprising first and second mold end sections and an intermediate mold section between said end sections and adapted to contact the radially outer surface of said air spring, said mold end sections having relative axial movement and being adapted to contact said intermediate section, whereby they may be assembled in a closing movement to exert pressure on and to collapse said air spring axially, said first mold end section and said intermediate mold section having cooperating annular molding surfaces to mold said large bead, said second mold end section having an axial projection extending inwardly into the cavtiy of said mold when said mold is closed and having annular molding surfaces on said projection and at the base thereof to shape and mold said small bead, means to bring said first and intermediate mold sections together to clamp and seal said large bead between said annular molding surfaces and to bring said second mold end section into forcible engagement with said small bead to initiate the axial collapse of said air spring with said axial projection extending into said small bead and making a substantially fluid-tight seal therewith, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

References Cited in the file of this patent
UNITED STATES PATENTS

| | | |
|---|---|---|
| 2,221,470 | Brown | Nov. 12, 1940 |
| 2,243,532 | Maynard | May 27, 1941 |
| 2,265,346 | Brown et al. | Dec. 9, 1941 |
| 2,571,258 | Kolins | Oct. 16, 1951 |
| 2,730,763 | Brundage | Jan. 17, 1956 |
| 2,812,544 | Soderquist | Nov. 12, 1957 |